United States Patent

Hemeryck et al.

[11] Patent Number: 5,816,380
[45] Date of Patent: Oct. 6, 1998

[54] TORSIONAL DAMPER, NOTABLY A CLUTCH FRICTION ASSEMBLY FOR A MOTOR VEHICLE

[76] Inventors: Bruno Hemeryck, 2 rue de l'Argillière, 80160 Belleuse; Christian Vandenhende, 2 rue d'Alès, 80090 Amiens, both of France; Carlos Lopez Perez, Calle Arganda-28, Madrid 5, Spain; Gérard Lefevre, 15 rue de l'Eglise, 80480 vers sur Selle, France

[21] Appl. No.: 669,457
[22] PCT Filed: Nov. 8, 1995
[86] PCT No.: PCT/FR95/01474
   § 371 Date: Jul. 8, 1996
   § 102(e) Date: Jul. 8, 1996
[87] PCT Pub. No.: WO96/14521
   PCT Pub. Date: May 17, 1996

[30] Foreign Application Priority Data

Nov. 8, 1994 [FR] France .................................. 94/13514

[51] Int. Cl.⁶ .......................... F16F 15/123; F16F 15/129
[52] U.S. Cl. .................. 192/204; 192/70.17; 192/213.1
[58] Field of Search ...................... 192/204, 205, 192/206, 209, 212, 70.17, 213, 213.1, 213.12

[56] References Cited

U.S. PATENT DOCUMENTS

| 5,240,458 | 8/1993 | Linglain et al. ............... 192/204 X |
| 5,246,398 | 9/1993 | Birk et al. ................... 192/204 X |
| 5,249,660 | 10/1993 | Feldhaus et al. ................ 192/204 |
| 5,251,736 | 10/1993 | Jeppe et al. ................... 192/204 |

FOREIGN PATENT DOCUMENTS

| 0322208 | 6/1989 | European Pat. Off. . |
| 0488859 | 6/1992 | European Pat. Off. . |
| 0579554 | 1/1994 | European Pat. Off. . |
| 2557655 | 7/1985 | France . |
| 2693778 | 1/1994 | France . |
| 8514735 | 12/1992 | Germany . |
| 2254398 | 10/1992 | United Kingdom . |

Primary Examiner—Rodney H. Bonck
Assistant Examiner—Saúl Rodríguez
Attorney, Agent, or Firm—Longacre & White

[57] ABSTRACT

A torsional damper having a disc (4), two guide washers (2,3), a hub (7) and low stiffness sprigs (8). The output member has a stepped annular flange (9) with a lower first area (73) and a second area (74) axially offset relative to the first portion. The second portion has teeth, and a bearing (91) is rotationally locked to the disc (4) to form a housing for the low stiffness springs (8).

16 Claims, 11 Drawing Sheets

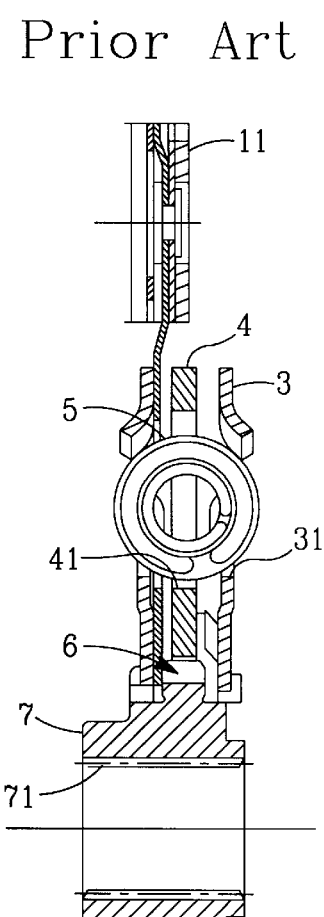
FIG. 1
Prior Art
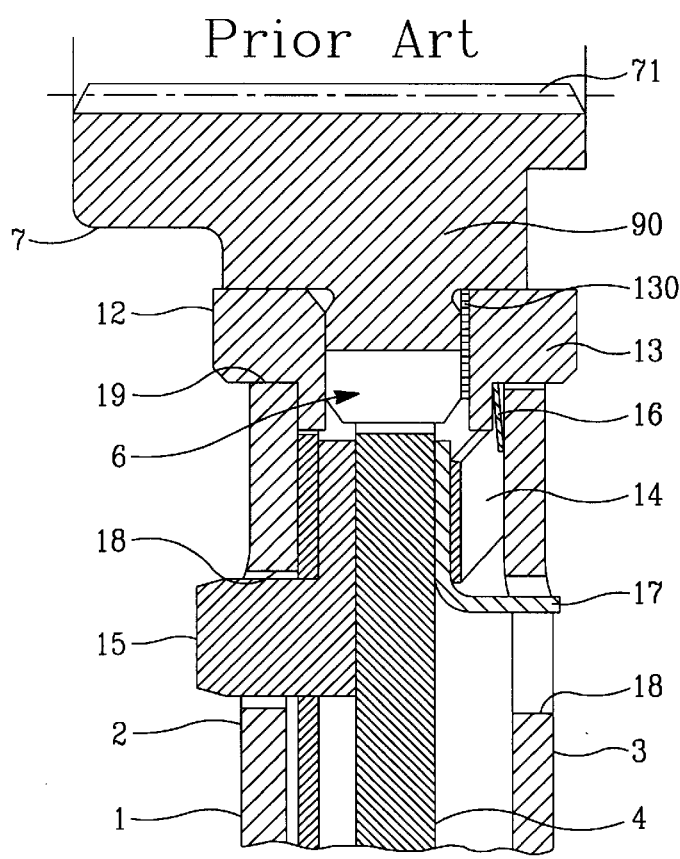
FIG. 2
Prior Art
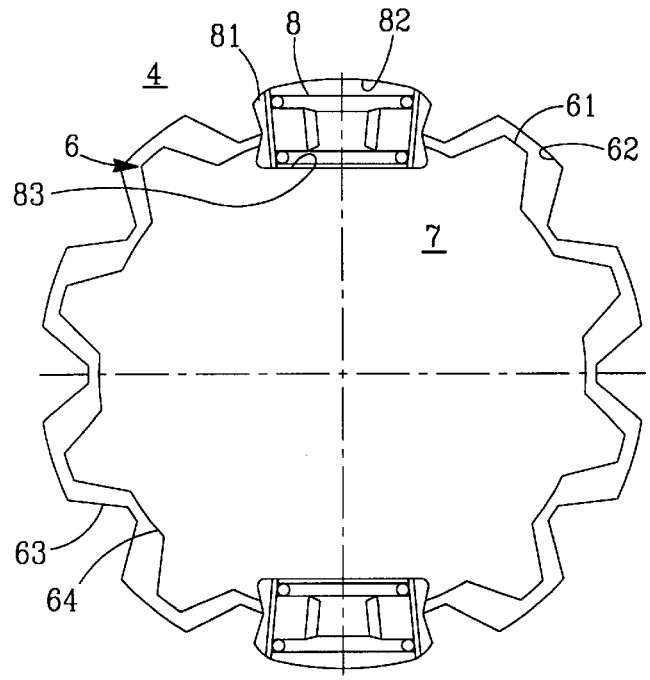
FIG. 3
Prior Art
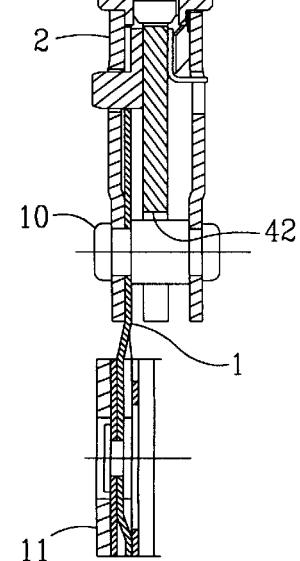

TORSIONAL DAMPER, NOTABLY A CLUTCH FRICTION ASSEMBLY FOR A MOTOR VEHICLE

BACKGROUND OF THE INVENTION

1. Field of the Invention

The present invention concerns torsional dampers, notably clutch friction assemblies for motor vehicles.

2. Description of the Prior Art

Such a damper is, for example, described in the document FR-A-2 693 778, and has (FIGS. 1 to 3) two coaxial parts mounted so as to move with respect to each other counter to first elastic members acting circumferentially 5, referred to hereinafter as high-stiffness springs, and first friction means 14, 17, 15 acting axially.

One of the parts has an input element 1 fixed to two guide washers 2, 3 connected to each other and fixed by columns 10.

The other part itself has a disc 4 and an output element 7 mounted so as to move with respect to each other counter to second elastic members 8 acting circumferentially, referred to hereinafter as low-stiffness springs, with the action of meshing means with clearance 6 and second friction means acting axially 13, 16, 12.

The meshing means with clearance 6 therefore limit the relative angular movement between the disc 4 and the output element 7.

More precisely, the guide washers 2, 3 are disposed on each side of the disc 4, being transversely oriented just like the disc 4.

The columns 10, on the one hand, pass with a circumferential clearance through the disc 4 by means of recesses 42 formed at the external periphery thereof and, on the other hand, also fix the input element to the guide washers 2, 3.

This input element 1 is here mounted on the internal face of the guide washer 2 and consists of a support disc bearing, at its external periphery, fixed on each of its faces, friction linings 11, optionally divided into segments.

The linings 11 are designed to be clamped between the thrust and reaction plates (not visible) of the clutch so that the input element is fixed with respect to rotation on a driving shaft, the crankshaft of the internal combustion engine in the case of application to a motor vehicle.

The output element 7 consists of a hub 7 provided on the inside with flutes 71 for its rotational connection to a driven shaft, namely the input shaft of the gear box in the case of application to a motor vehicle.

The engine torque is thus transmitted from the input element 1 to the output element 7.

The first elastic members 5 consist of coil springs mounted in pairs in housings 31, 41, apertures in this case, formed respectively opposite each other in the guide washers 2, 3 and the disc 4.

In this case, the pairs of springs 5 are mounted without clearance in the apertures 31 in the guide washers 2, 3 and without clearance for certain pairs in the apertures 41 of the disc 4 and with clearance for the other pairs in the said apertures 41.

The springs 5 thus act in a stepped manner whilst being more rigid than the second elastic members 8 also consisting of coil springs, with a lower stiffness in this case, notably to filter the vibrations when the vehicle engine is idling.

The high-stiffness springs 5 are designed to filter the vibrations while the vehicle is moving.

The meshing means with clearance 6 include teeth formed at the internal periphery of the disc 4 and complementary teeth formed at the external periphery of the output hub 7 by means of a radial flange 90 which the said hub 7 has radially projecting at its external periphery.

The hub 7 thus has trapezoid-shaped teeth 61 meshing with circumferential clearance with recesses 62 in the disc 4 and vice versa, the said disc 4 having trapezoid-shaped teeth 63 meshing with circumferential clearance with recesses 64 in the hub 7 surrounded by the guide washers 2, 3 and the disc 4.

The flange 90 of the hub 7 is provided with recesses 83 open radially towards the outside. The disc 4 has, in correspondence at its internal periphery, recesses 82 open radially towards the inside.

The low-stiffness springs 8 are thus mounted in the recesses 82, 83, facing each other and bearing on the lateral edges of the said recesses 82, 83 by means of cups 81 with a back face in the shape of a dihedron to marry the shape of the said lateral edges.

These cups 81 each have a centring stud penetrating a spring 8 (FIG. 3) to hold the said springs radially.

The first friction means include, on the one hand, a friction washer 15, made of a synthetic material in this case, interposed axially between the disc 4 and the washer 2, more precisely between the disc 4 and the support disc 1 and, on the other hand, an application washer 17, made of metal in this case, and an axially-acting elastic washer 14, in this case a crinkle washer, interposed between the disc 4 and the guide washer 3.

The guide washers 2, 3 are similar to each other in this case and have openings 18 radially above the flange 90 and recesses 19 at their internal periphery.

The openings 18 are designed for the passage respectively of the studs belonging to the washer 15 and lugs belonging to the washer 17.

The washers 15 and 17 are thus rotationally fixed through cooperation of shapes respectively with the guide washers 2 and 3 so that the washer 14 bears on the guide washer 3 to force the washer 17 into contact with the disc 4 and flange the washer 15 between the disc 4 and the assembly consisting of the guide washer 2 and support disc 1, the studs of the washer 15 of course passing, as can be seen in FIG. 2, through the disc 1 joined to the guide washer 2.

The recesses 19 are designed to mesh with crescents which the bearings 12, 13 have at their external periphery. The bearings 12, 13 are made of plastic in this case and are therefore connected with respect to rotation by cooperation of shapes respectively to the guide washer 2 and to the guide washer 3.

These bearings are interposed between the internal periphery of the washers 2, 3 and the external periphery of the hub 7. They each have a transverse part making direct or indirect contact with the flange 90.

In this case, the bearing 12 is interposed axially between the flange 90 and the guide washer 12, while a protective washer 130 is interposed between the bearing 13 and the flange 90, the said bearing 13 being subjected to the action of an axially-acting elastic washer 16, in this case an elastic washer of the Belleville type, bearing on the guide washer 3.

The washer 16 thus pushes the bearing 13 in the direction of the flange 90 and enables the transverse part of the bearing 12 to be clamped between the flange 90 and the guide washer 2.

It will be noted that the bearing 12 serves to centre the guide washers 2, 3.

This arrangement gives satisfaction, but the recesses 82, 83 affect the meshing means with clearance 6 and therefore reduce the strength of the disc 4 and flange 90 of the hub 7, so that it is not possible to attach a large number of low-stiffness springs 8.

Furthermore, the friction means entail a large number of parts.

In order to stiffen the disc 4 and hub 7, and freely choose the number of low-stiffness springs 8, it is possible to use an arrangement of the type described in the document FR-A-2 611 245.

In this document, a torsional predamper is provided which is mounted between the disc and one of the guide washers. This predamper has two guide washers and a secondary disc meshing without clearance with the teeth on the hub with height reduced to this level, so that the teeth in the disc and hub are not weakened.

This solution makes it possible, depending on the application, to install the required number of low-stiffness springs. It is thus possible to install two or more than two low-stiffness springs.

However, the teeth on the hub obtained by broaching affects the flange on the hub for the most part, so that burrs appear and it is necessary to provide a protective metal plate between the flange on the hub and the bearing adjacent to the said flange in FIGS. 1 to 3.

The Applicant wondered whether it would be possible to take advantage of such a bearing.

The object of the present invention is therefore to overcome these drawbacks and thus to create, in a simple and economical manner, a torsional predamper with meshing means with rigid clearance, while having a free choice as regards the number of low-stiffness springs and taking advantage of the centring bearing of the guide washers.

SUMMARY OF THE INVENTION

According to the invention, a damper of the type indicated above is characterised in that the output element has on its external periphery a stepped flange having a first area and a second area offset axially with respect to the first area, in that the said second area has continuously on its external periphery the teeth of the output element belonging to the meshing means with clearance, in that the low-stiffness elastic members are housed in the said first area in open recesses formed in an annular bearing fixed with respect to rotation on the disc and interposed, on the one hand, radially between one of the guide washers, called the first guide washer, and the output element and, on the other hand, axially between the disc and the said first guide washer, so that the low-stiffness springs are housed in a cavity defined by the said bearing and the said first area of the flange of the output element and the meshing means with clearance.

By means of the invention, the low-stiffness springs are installed radially at the meshing means with clearance and it is not necessary to provide a protection plate to protect the centring bearing of the guide washers formed by the bearing according to the invention.

It is possible to choose freely the number of low-stiffness springs.

In one embodiment, the first area is of reduced height, the second area projecting radially towards the outside with respect to the first area. In another embodiment, the first area can extend in slight radial projection with respect to the second area.

The bearing according to the invention allows the disc to be centred with respect to the hub whilst reducing the number of components in the friction means.

It will be appreciated that the meshing means with clearance are rigid, since they are not affected by recesses housing the low-stiffness springs.

In one embodiment, the low-stiffness elastic members are housed in open recesses formed radially opposite in the first area of the flange of the output element and in the said annular bearing.

As will have been understood, the recesses formed in the hub (the output element) are closed off by the second area of the flange of the hub or by the disc.

This arrangement simplifies the torsional damper and reduces the number of parts thereof.

As a variant, the bearing houses most of the low-stiffness elastic members. These elastic members can then have a curved shape and be mounted in series.

By virtue of this arrangement, it is possible to reduce the axial size of the torsional damper and simplify the guide washer.

In all cases, use is made of the bearing.

Advantageously, the hub is obtained by sintering or any other method, for example moulding, forging or cold or hot stamping, enabling burrs to be eliminated.

The following description illustrates the invention in relation to the accompanying drawings in which:

BRIEF DESCRIPTION OF THE DRAWINGS

FIG. 1 is a view in axial section of a clutch friction assembly of the prior art;

FIG. 2 is a view to a larger scale of the lower central part in FIG. 1;

FIG. 3 is a diagrammatic view of the meshing means with clearance in FIG. 1;

DETAILED DESCRIPTION OF THE PREFERRED EMBODIMENT

For the sake of simplicity, common elements of the prior art and the present invention will be given the same reference signs. In the embodiments according to the invention, the common elements will be given the same reference signs.

Figure 4:
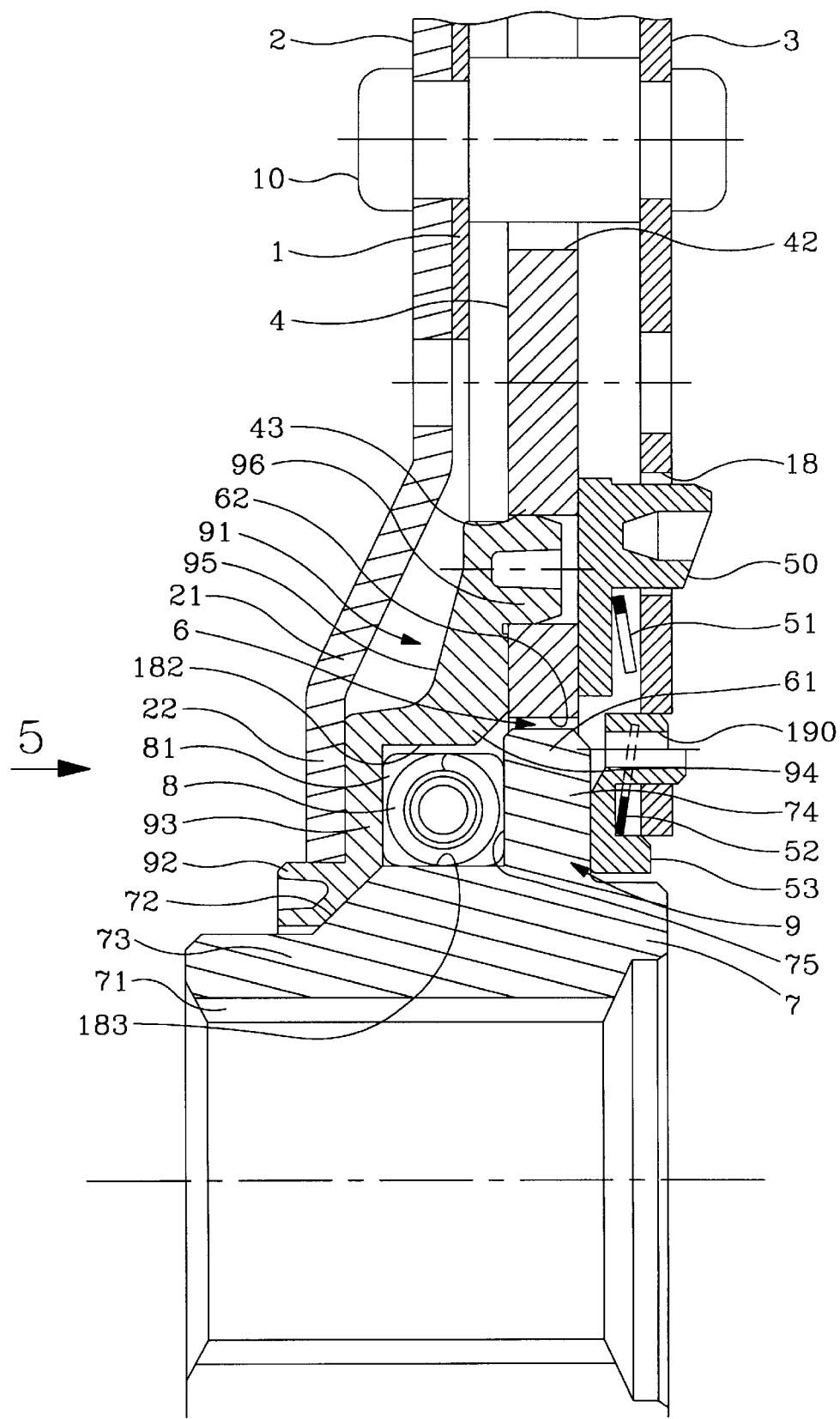
FIG. 4 is a partial half-view in axial section of a clutch friction assembly according to the invention.

In FIG. 4, the high-stiffness springs couple the disc 4 to the guide washers 2, 3 as in FIG. 1 and the torsional damper consists of a clutch friction assembly with friction linings.

Thus in FIG. 4 at 2 and 3 the guide washers are seen connected to each other by fixing columns 10 passing with circumferential clearance through peripheral openings 42 provided in the disc 4 provided on its internal periphery with teeth meshing with clearance with complementary teeth provided at the external periphery of the output element of the damper in the form of a hub 7 for forming meshing means with clearance 6 as in FIG. 3, the hub 7 having, as in FIGS. 1 to 3, at its external periphery, trapezoid-shaped teeth 61 engaging with clearance with recesses 62 provided on the internal periphery of the disc 4 and vice versa.

These washers 2, 3 surround the hub 7. Similarly, the disc 4 surrounds the annular-shaped hub 7.

Thus the support disc 1, forming the input element of the torsional damper, is joined to the guide washer 2, being fixed thereto by means of columns 10.

This disc bears at its external periphery the friction linings designed to be clamped between the thrust and reaction plates of the clutch in the aforementioned manner.

First axially-acting friction means act between the two coaxial parts of the torsional damper including respectively the guide washers 2, 3 and the disc 4 with its output hub 7.

These first friction means include, as in FIGS. 1 to 3, a friction washer 50 and an elastic washer 51 acting axially interposed between the guide washer 3 and the disc 4.

In this case, the friction washer 50 is made of plastic and has studs penetrating the holes 18 of the guide washer 3 in a complementary manner so as to rotationally connect the said friction washer 50 to the guide washer 3.

The elastic member 51 consists of a Belleville washer bearing on the guide washer 3 to act on the friction washer 50 and force it into contact with the disc 4.

The second friction means include a friction washer 53, also made of plastic, and an axially-acting elastic washer 52 interposed between the guide washer 3 and one of the faces of an annular flange 9 of the hub 7 provided at its internal periphery with flutes 71 designed to rotationally connect the hub 7 to the input shaft of the gear box.

The friction washer 53 has at its external periphery studs engaged in a complementary manner in openings 190 in the guide washer 3 to rotationally connect the washer 53 to the guide washer 3 by cooperation of shapes.

The elastic means 52 consist of a Belleville washer bearing on the guide washer 3 to act on the friction washer 53 and force the latter into contact with the flange 9 of the hub in which the teeth of the hub 7 belonging to the meshing means with clearance 6 are formed.

The washers 50, 51 of the first friction means surround the washers 52, 53 of the second friction means.

According to one characteristic of the invention, an annular bearing 91 is interposed axially between the disc 4 and the internal periphery of the guide washer 2. This bearing is interposed radially between the internal periphery of the guide washer 2 and the external periphery of the hub 7.

Thus the elastic washer 51 makes possible, in the manner described hereinafter, a clamping of the bearing 91 between the disc 4 and the guide washer 2 and the Belleville washer 52 makes possible a clamping of the bearing 91 between the hub 7 and the guide washer 2.

Thus the bearing 91, in this case advantageously made of a synthetic material, such as plastic reinforced with glass fibres, is common to both friction means.

More precisely, in order to reduce the number of components in the friction means, while stiffening the meshing means with clearance 6, and while having the possibility of increasing the number of low-stiffness springs 8 of the second circumferential-action elastic members, acting circumferentially between the disc 4 and the output element 7 (the hub 7), the present invention is characterised in that the output element 7 has at its external periphery, projecting radially towards the outside, a stepped flange 9 having a first area 73 and a second area 74 axially offset with respect to the first area, in that the second area 74 has at its external periphery in a continuous manner the teeth of the output element 7 belonging to the meshing means with clearance 6, in that the low-stiffness elastic members 8 acting circumferentially are housed in the said first area 73 in open recesses formed in the bearing 91 fixed with respect to rotation to the disc 4 while being interposed on the one hand radially between one of the guide washers 2, referred to as the first guide washer, and the output element 7 and, on the other hand, axially between the disc 4 and the said first guide washer 2 so that the low-stiffness springs 8 are housed in a cavity defined by the said bearing 91 and the said first area 73 of the stepped flange 9 and the meshing means with clearance 6.

By virtue of the invention it is possible to increase the circumferential width of the teeth of the hub 7 and of the disc 4 since the recesses 183, 182 housing the low-stiffness springs 8, formed respectively in the area 73 and in the bearing 91, are offset axially with respect to the meshing means with clearance 6. The disc 4 and hub 7 are therefore stiffened, the disc 4 having continuous complementary teeth mirroring the hub 7.

Figure 5:
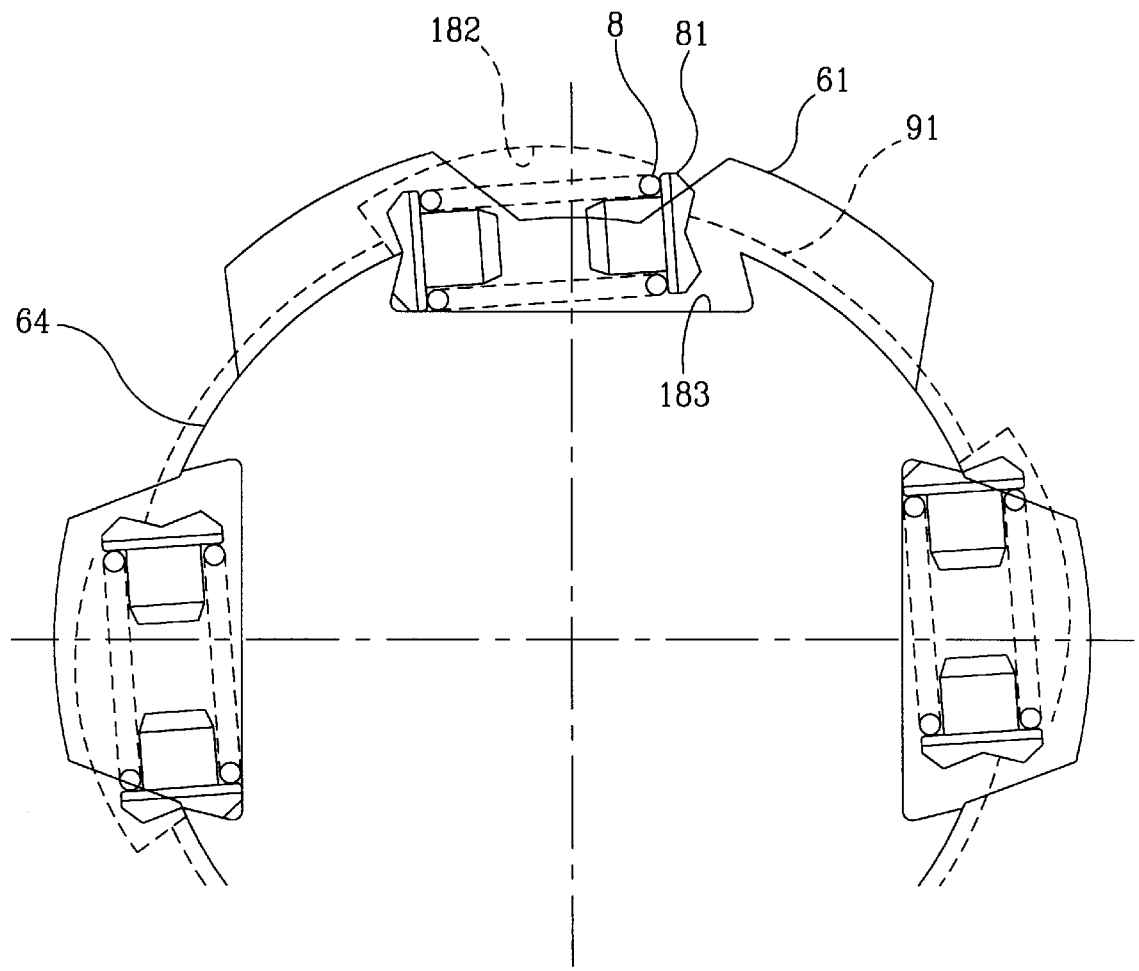
FIG. 5 is a partial view of the output element in the direction of the arrow 5 in FIG. 3, the low-stiffness springs being compressed and with the recesses of the bearing shown in dotted lines.

In this FIG. 4, the second area 74 projects radially towards the outside with respect to the first area 73 of reduced height. Thus the teeth 61 of the disc 7 extend radially above the springs 8 (FIG. 5).

The low-stiffness elastic members 8 are housed in open recesses formed radially opposite in the first area 73 of the flange 9 of the output element and in the bearing 91.

The recess 183 formed in the area 73 being open radially towards the outside in the direction of the recess 182 in the bearing 91 open radially towards the inside, that is to say towards the hub 7.

In this case, the bearing 91 is rotationally fixed on the disc 4 by means of a plurality of studs 96 which it has at its external periphery and which are each engaged in a corresponding opening 43, in this case in the form of holes formed in the disc 4.

Thus the bearing 91 is rotationally connected to the bearing 4 by cooperation of shapes.

It will be noted that the friction washer 50 blocks the openings 43 and that the friction means, notably the plastic annular bearing 91, are located radially below the elastic members 5 in FIG. 1.

The bearing 91 has, moving from its internal periphery to its external periphery, respectively an axially oriented ring 92, a first wall 93 with an overall transverse orientation, a wall 94 with an overall axial orientation and a second wall 95 with an overall transverse orientation carrying at its external periphery the studs 96, in this case distributed regularly and circumferentially like the openings 43.

The ring 92 forms a bearing interposed radially between the internal periphery of the guide washer 2 and a tapered wall 72 defining the first area 73.

The back end of the ring 92 is therefore tapered so as to marry, in a complementary fashion, the shape of the tapered wall 72 of the hub 7. A radial clearance exists between the internal bore of the ring 92 and the hub 7.

The first wall 93 extends transversely in contact with the internal face of the guide washer 2. More precisely, the guide washer 2 is enlarged at its centre and has at its internal periphery an overall transverse wall 22 connected by an inclined wall 21 to the main part of transverse orientation of the guide washer 2.

By means of the wall 21 an offset of the wall 22 is thus produced with a space formed to house the bearing 91.

The first wall 93 is in contact with the internal face of the wall 22. The wall 94 forms overall an axial brace between the disc 4 and the wall 22 of the guide washer 2.

The second transverse wall 95 is in contact with the disc 4 while being thus axially offset with respect to the first wall 93.

It will be noted that this second wall 95 is thickened where it connects with the wall 94.

The second wall thus splays in the direction of its external periphery.

It is in the wall 94 that recesses 182 visible in dotted lines in FIG. 5 are formed.

These recesses 182 are formed at the internal periphery of the axial wall 94 while being radially open towards the inside. They have sloping lateral edges.

Opposite each recess 182, the first area 73 of the flange 9 of the hub 7 has a recess 183 with inclined lateral edges.

This recess 183 is formed at the axially oriented external periphery of the first area 73 while being radially open towards the outside in correspondence with the recess 182, it being known that the axial wall 94 surrounds the first area 73 with radial clearance.

In this case, four low-stiffness springs 8, of the coil spring type, are mounted in the recesses 182, 183. These recesses being distributed regularly and circumferentially just like the springs 8. Of course, this number depends on the applications.

These springs 8 bear on the inclined lateral edges of the recesses 182, 183 by means of bearing cups 81 with a back face in the shape of a dihedron and with centring studs each penetrating the springs 8 to hold them radially.

Thus the bearing 91 enables the disc 4 to be centred with respect to the hub 7 while also centring the guide washer 2 (and therefore the guide washers 2, 3) by means of its ring 92.

It will be noted that the cups 81 have a width which is a function of the axial distance between the first wall 93 and the second area 74 of the flange 9.

These cups are not forced by the spring 51 as the wall 94 of the bearing 91 forms a brace between the disc 4 and the guide washer 2.

As the ring 92 has a tapered portion in contact with the tapered portion 72 of the hub 7 the said cups 81 are also not clamped axially by the elastic washer 52.

This elastic washer 52 has, in a manner known per se, a load such that it does not cancel out the action of the low-stiffness springs 8 belonging to the second circumferentially acting elastic means of the torsional damper.

The washer 51 develops an axial load which takes account of the stiffness of the springs 5 in FIG. 1.

This washer 51 has a higher rating than the washer 52.

It will be noted that the second area 74 of the flange 9 has a transverse face 75 defining the cavity housing the springs 8. The recesses 183 are therefore closed off by the adjacent face 75 of the second area 74.

It will be noted that the recesses 64 in the teeth of the hub 7 are located radially above the recesses 183 of the first area 73 of the flange 9 and that the bearing 91 and the friction washer 53 have clearance bevels for the meshing means with clearance 6, the wall 95 being located overall radially beyond the end of the recesses of the teeth of the disc 4.

There thus exists an axial clearance between the bearing 91 and the second area 74, and the friction face of the washer 53 is axially offset with respect to the external periphery of the washer 53. This friction face is located radially below the teeth of the second area 74 and rubs on the adjacent transverse face of this second area 74, which thus offers the washer 53 a continuous friction area.

Thus, by virtue of the invention, the friction means 53, 91 are formed and it will be noted that the washer 52 is inclined in the direction of the hub 7 to take account of the axial offset which exists between the internal and external periphery of the washer 53 by means of the aforementioned clearance bevel.

Advantageously, the hub 7 is produced by sintering using compressed metal particles so that it is easy to produce the recesses 183 and any risk of burring is eliminated, without any need for repeated machining.

The torsional damper according to the invention operates as follows:

in a first step, the guide washers 2, 3 and the disc 4 form a single-piece unit by virtue of the high-stiffness elastic members 5 which couple them.

During this first phase, the disc 4 moves angularly with respect to the hub 7 with compression of the springs 8 (as can be seen in FIG. 5) and friction occurs between the ring 92 and the tapered part 72 of the hub 7 and between the washer 53 and the adjacent transverse face of the second portion 74 of the flange since the guide washers are fixed to the disc 4 in the aforementioned manner.

This first phase continues until the teeth of the disc 4 engage with the teeth 61 of the hub 7 with the clearance of the meshing means with clearance 6 being closed up and the relative angular movement between the disc 4 and hub 7 being limited.

From this moment on, the disc 4 becomes rotationally fixed to the hub 7 and the springs 5 are permitted to be compressed, the guide washers 2, 3 move angularly with respect to the disc 4 and hub 7. This second phase continues until the braces make contact with the edge of the openings 42 of the disc 4.

Thus, as before, friction occurs between the flange 9 of the hub 7 and the washer 53 and between the ring 92 and the wall 72 of the hub 7.

An additional friction occurs. This friction is due to the friction washer 50 rubbing against the disc 4, and the bearing 91 rubbing through its transverse wall 93 against the transverse wall 22 of the guide washer 2 under the action of the washer 51.

The guide washer 2 then pivots about the ring 92.

It will be noted that a radial clearance exists between the internal periphery of the washer 53 and the opposite external periphery of the hub 7.

Of course, during this second phase, the springs 8 remain tensioned.

An economical torsional damper is thus obtained which has a reduced number of parts, the bearing 91 being easily produced by moulding.

This damper includes two torsional damping devices with staged action coupling the input element 1 with the output element 7, one with high stiffness, to filter vibrations while the engine is running, including the springs 5, the washers 2, 3, the disc 4 and the first friction means, the other including, to filter the vibrations while the engine is idling, the bearing 91, the hub 7, the springs 8 and the second friction means.

Of course, the present invention is not limited to the example embodiment described.

In particular, the disc 1 can be fixed directly to a plate itself fixed to the crankshaft of the internal combustion engine.

As a variant, the input element can be formed by an extension of the transversely oriented guide washer 2, just like the disc 4 and the other guide washer 3.

The torsional damper is then interposed between the engine of the vehicle and a transmission box thereof, for example a transmission box with variable pulley and belt. The output element 7 is not necessarily a hub fluted on the inside. It can, for example, be attached by screwing to a plate fixed to the driven shaft.

The braces 10 can be formed by means of one of the guide washers having for this purpose at its external periphery axially oriented lugs forming tenons engaged in corresponding mortices in the other guide washer whilst being fixed thereto for example by crimping or welding.

In this case, the braces surround the disc without making contact with it and the angular movement between the disc and the guide washers is limited by the turns on the high-stiffness springs 5 becoming contiguous.

Of course, it is possible to replace the washers 50, 51 with the washers 17, 14 in FIG. 2. Similarly, it is possible to replace the washer 53 with the bearing 13 in FIG. 1 then mounted with radial clearance with respect to the hub 7.

Similarly, the washer 52 can consist of a corrugated spring washer.

Figure 6:
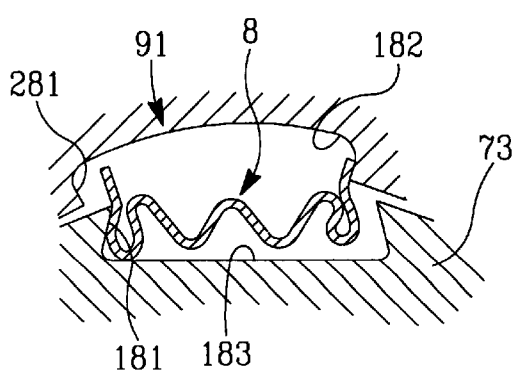
FIGS. 6 and 7 are views showing other shapes of the low-stiffness elastic members.

The springs 8 can consist of crinkle springs, as described in the document FR-A-2 557 655, and include (FIG. 6) support elements integral with the said spring so that the cups 81 are eliminated. In this case, the support elements 181 are in the shape of a dihedron to bear upon the inclined lateral edges 281 of the recesses 182, 183.

Figure 10:
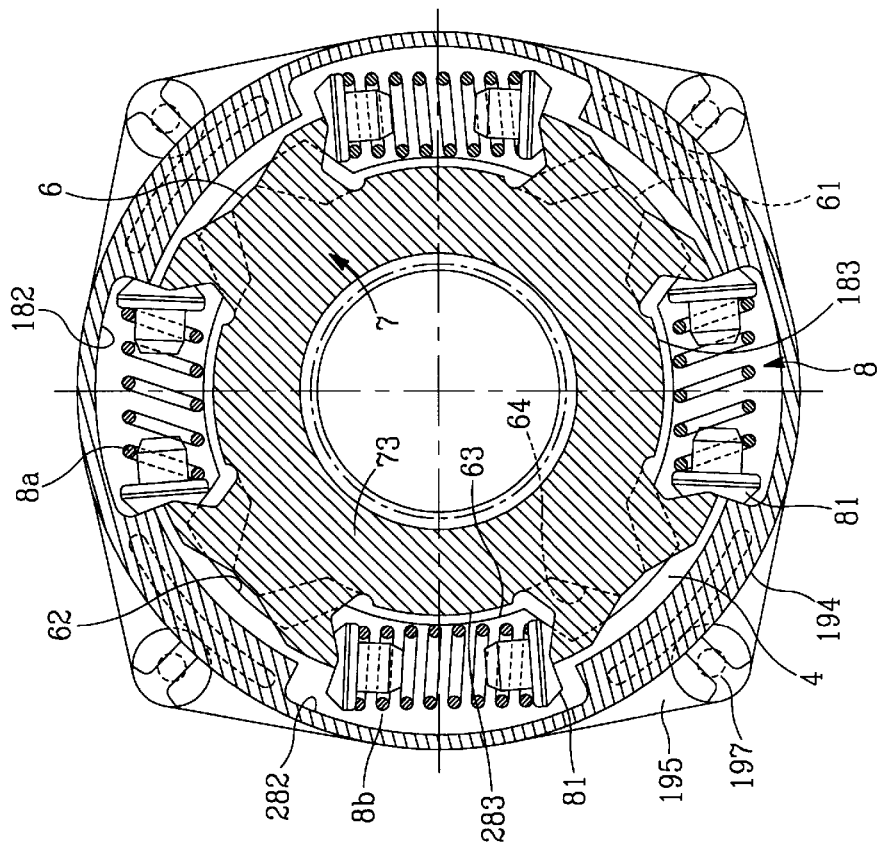
FIG. 10 is a view in cross section along the line 10—10 in FIG. 9.

Of course, as a variant, the spring 8 can be of the same type as the one in FIG. 10 in the aforementioned document.

Figure 7:
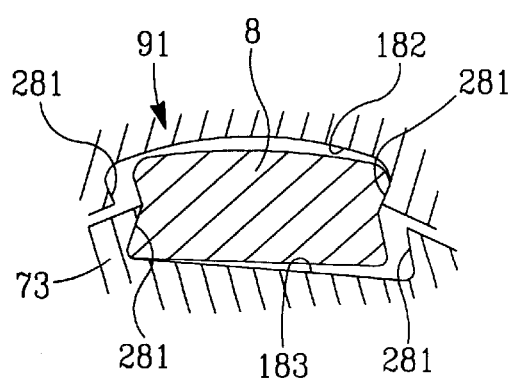

As a variant (FIG. 7), the springs 8 can consist of blocks of elastic material such as elastomer with circumferential ends in the shape of a dihedron for direct or indirect bearing, through support elements, with the lateral edges of the recesses.

It will be appreciated that the wall 72 assists the production of the recesses 183 and that the hub 7 can be produced as a variant by moulding, laser cutting, forging, cold or hot stamping or any other method which allows the areas 73, 74 to be obtained.

The bearing 91 need not be conical, the ring 92 then being without a conical wall, just like the hub 7.

In this case, the internal periphery of the ring 92 rubs against a cylindrical area opposite the hub 7 whilst being axially fixed by a transverse shoulder defining the first area 73 of the flange 9.

The disc 4 can have axial projections, obtained for example by orbital forging, to enter complementary openings produced on the external periphery of the second transverse wall 95 of the bearing 91 and rotary connection therewith.

The studs 96 can enter, in a complementary manner, a notch formed at the internal periphery of the apertures 41 in the disc 4 to rotationally connect the bearing 91 to the disc 4.

According to the applications, the springs 8 can be disposed entirely radially below the meshing means with clearance 6.

It is possible to combine the springs 8 with, for example, alternating coil springs and blocks of elastic material.

In every case, there is no contact between the guide washers 2, 3 and the meshing means with clearance 6.

Of course (FIGS. 8 to 10) the disc 1 (the input element) can be in contact with the external face of the guide washer 2 while being fixed thereto by the columns 10.

In these figures, elements common to those in FIGS. 4 to 7 are given the same reference signs.

It will be noted that the guide washer 2 has, for improved centring, at its internal periphery an axially oriented annular rim 122 in contact with the external periphery of the ring 92 of the bearing 91, also provided with a first transverse wall 93 extended at its external periphery by an axially oriented wall 194 forming a brace between the guide washer 2 and the disc 4, the first wall 93 being in contact with the wall 22 of the washer 2. The bearing 91 is annular in shape and made of plastic.

In this case, the wall 194 has recesses 182, 282 for housing the low-stiffness springs 8. These recesses 182, 282 have different circumferential lengths, as do the recesses 183, 283 formed in the area 73 of the flange 9 to house the springs 8.

More precisely, by virtue of the invention, the springs 8 can have a staged action and include for example two springs 8a, in this case coil springs, diametrically opposite and mounted without circumferential clearance by means of cups 81 in the recesses 182, 183 formed radially opposite respectively in the wall 194 of the bearing 91 and in the area 73 as in FIGS. 4 to 7.

Two other springs 8b, coil springs in this case, diametrically opposite and alternating with the springs 8a in a regular manner, are mounted without clearance in the recesses 283, open radially towards the outside, produced in the area 73 and with circumferential clearance in the recesses 282, open radially towards the inside, produced in the wall 94 of the bearing 91, more precisely at the internal periphery thereof.

The springs 8b are longer and stiffer than the springs 8a. They act differentially with respect to the springs 8a, after the clearance between the circumferential edges of the recesses 282 and the cups 81 with a dihedron-shaped back face has been closed up.

It is thus possible, by virtue of the invention, without mechanically weakening the disc 4 and hub 7, to mount springs 8a, 8b with staged action so as to better filter the vibrations while the vehicle engine is idling. These springs are therefore mounted in series in the recesses 182, 183 and 282, 283.

It is also possible to produce a bearing 91/springs 8a, 8b/cup 81/disc 4 assembly by forcibly fitting the studs, numbered 196 in this case, of the bearing 91 into the associated openings 43 in the disc 4.

Figure 9:
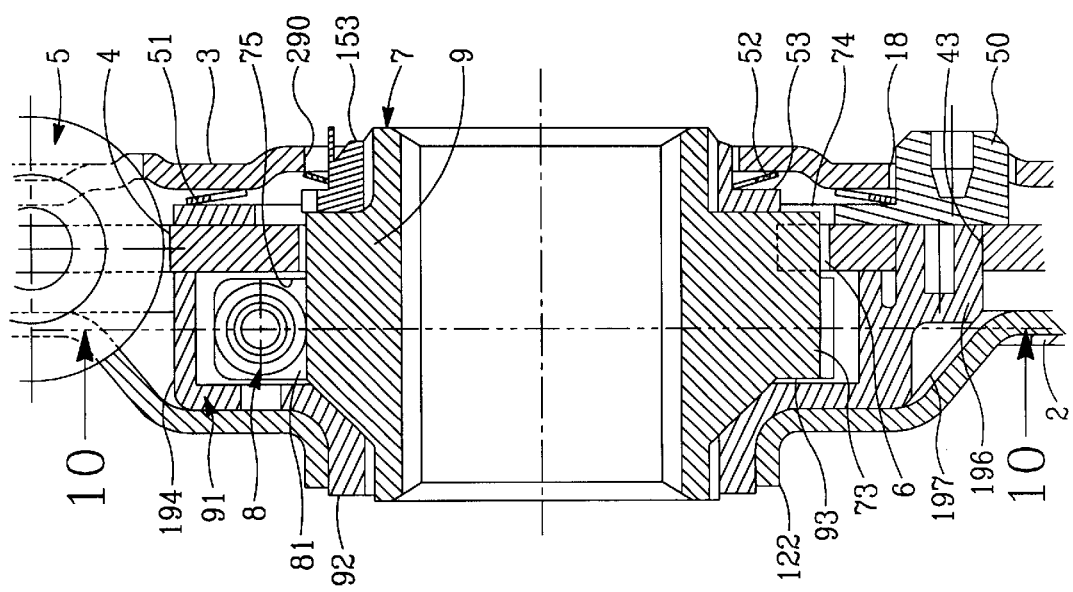
FIG. 9 is a view to a larger scale of the central part of FIG. 8.

The studs 196 are, in this case, carried by lugs 195 extending transversely at the external periphery of the wall 194. The lugs 195 are not in contact with the disc 4 (FIG. 9). They are located in the thick areas of the wall 194 (FIG. 10), close to the disc 4.

Reinforcing ribs 197 are provided to connect the rear of the lugs to the wall 194. The ribs 197 extend parallel to the inclined wall 21 of the washer 2.

It will be noted that the first area 73 extends in this case radially projecting with respect to the second area 74 at the level of the springs 8a, 8b.

It will be noted that the friction washer 53 is thickened locally at 153 to form a projection engaging in a complementary manner in notches 290 formed at the internal periphery of the guide washer 3.

The friction washer 53 is thus connected with respect to rotation to the guide washer 3.

As in FIGS. 4 to 7, the friction washer 50 masks the openings 43.

Figure 8:
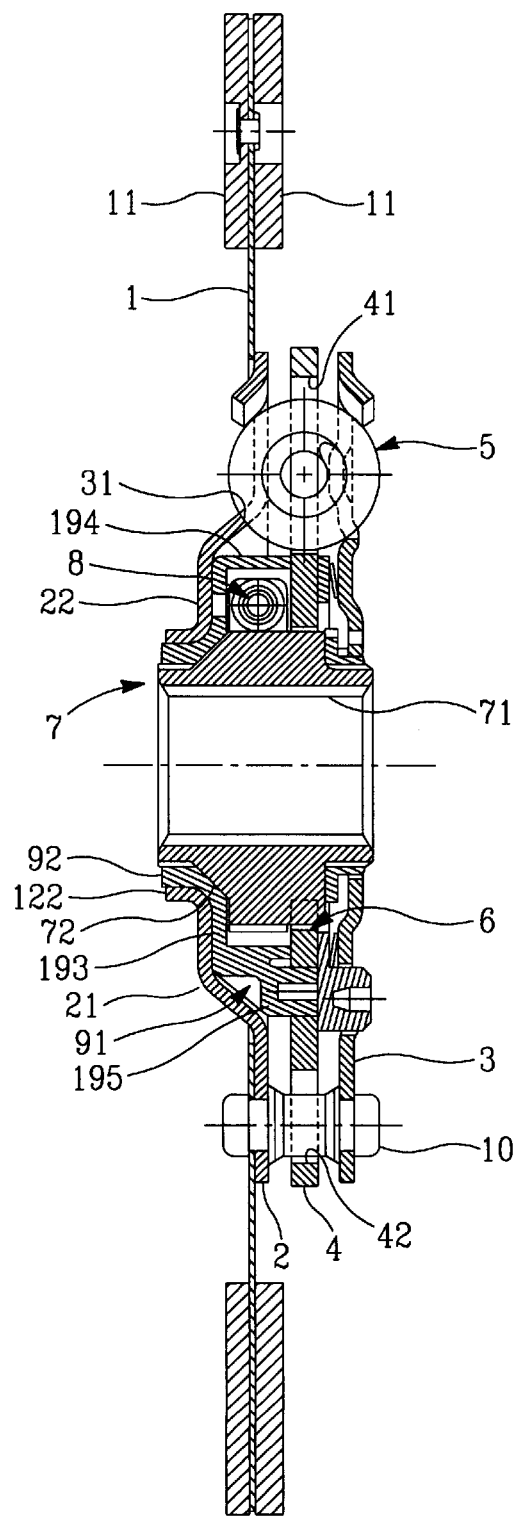
FIG. 8 is a view in axial section of a clutch friction assembly for another example embodiment of the invention.

In FIGS. 8 to 10 the bearing 91 therefore has a second, overall transversely oriented wall segmented into lugs 195.

In FIGS. 8 to 10 the springs 8a, 8b extend radially above the bottom of the recesses 64 of the hub 7, located on the same circumference as the bottom of the recesses 183, 283 (FIG. 10). They are housed in a cavity defined by the first area 73 and the meshing means with clearance 6 of the stepped flange 9, more precisely by the teeth 63 in the disc 4.

In FIG. 5, the bottom of the recesses 183, 283 extends radially below the bottom of the recesses 64 in the disc 7, the springs 8 are therefore located partly below the meshing means with clearance 6. This is due to the fact that the area 74 projects radially towards the outside with respect to the area 73.

In all cases, the low-stiffness elastic members 8 are located as close as possible to the axial axis of symmetry of the clutch friction assembly and are therefore less sensitive to centrifugal force. These members 8 are retained radially by the axial wall 94, 194 of the bearing 91. This bearing 91, through its wall 93, masks the said members 8 and prevents the cups 81 from escaping from the recesses 183, 283.

It will be noted that, in the embodiment in FIGS. 8 to 10, the teeth 63 of the disc 4 are opposite the springs 8a, 8b in the idle position of the damper.

In FIG. 5, the springs 8 are, at their circumferential end, opposite the teeth 61 of the hub 7 in the idle position of the damper.

In all cases, the cups 81 are unable to escape.

Of course, it is possible also to use the axial wall 94, 194 of the bearing 91 to simplify the guide washer 2 and notably to eliminate the inclined wall 21 thereof.

It is also possible to make use of the bearing 91 to reduce the axial size of the torsional damper.

Thus in FIGS. 11 to 14, in which elements identical to those in the preceding figures will be given the same reference signs, the bearing 91, annular in shape and made of plastic, has of a single piece, in this case by moulding from its internal periphery to its external periphery an axially orientated ring 92, a first wall 193 with a transverse orientation overall, a wall 294 with an axial orientation directed towards the disc 4 and a second wall 295 with a transverse orientation overall, carrying studs 296.

The ring 92, directed axially in the reverse direction with respect to the axial wall 294, is, through its internal periphery, in close contact with the external periphery of the hub 7.

The first wall 193 and the axial wall 294 are scalloped at 482 to house the low-stiffness elastic members, consisting in this case of curved springs 480, 481 mounted in series in the manner described hereinafter.

The recess 482 is semi-circular in shape overall, to house the said springs 480, 481, in this case in the form of coil springs. It is open in the direction of the disc 4.

The external periphery of the axial wall 294 is in close contact with the internal periphery of the guide washer 2, and more precisely with the internal bore of an axially oriented annular rim 222, facing the opposite direction to the disc 4, which the guide washer 2 has at its internal periphery. Of course, the axial wall 294 is annular in shape.

Thus the bearing 91, by virtue of its ring 92 and its wall 294, enables the guide washer 2 to be centred whilst simplifying it, the presence of the inclined area marked 21 in FIGS. 4 to 10 no longer being necessary.

In this case, the wall 193 no longer serves as a friction washer as in FIGS. 4 to 10. On the other hand, it is the second wall 295 which serves as a friction ring, the said wall 295 being allowed to rub against the internal face of the guide washer 2.

The bearing 91 projects axially with respect to the rim 222. This bearing 91 therefore forms a radial brace, by virtue of its wall 93, between the hub 7 and the guide washer 2, and the springs 480, 481 are mounted in a cavity defined by the first area 73, the second area 74 (the meshing means with clearance 6) and the bearing 91 masking the said springs 480, 481.

As in the previous figures, the area 74 has at its external periphery, in a regular manner (FIG. 13), female teeth, while the disc 4 has at its internal periphery male teeth entering the female teeth of the hub 7 with clearance to create meshing means with clearance 6.

It will be noted that, in this case, the teeth and recesses of the meshing means with clearance 6 are in the shape of an annular sector.

The area 74 is therefore without a housing recess for the low-stiffness springs.

The area 73 has at its axial extremity near the ring 92 a change in diameter forming a shoulder to axially fix a secondary disc 201.

In the other axial direction the disc 201 is fixed axially by folding of material (crimping) of the free axial end of the first area 73 of reduced thickness with respect to the second area 74.

Meshing means without clearance 160, forming a means of rotational connection through cooperation of shapes, act between the internal periphery of the secondary disc 201 and the external periphery opposite the first area 73.

Thus the disc 201 has at its internal periphery shallow recesses entered in a complementary manner by radially projecting teeth coming from the external periphery of the hub 7.

Thus the secondary disc 201 is connected with respect to rotation to the hub 7 by the said meshing means without clearance 160. This disc 201 is also fixed axially on the hub 7 in the aforementioned manner so that this secondary disc 201 is fixed to the hub 7.

The meshing means without clearance 160 are distinct from the meshing means with clearance 6 and are located radially below the said meshing means with clearance 6.

Axially, the meshing means without clearance 160 are positioned between the areas 93 and 295 of the bearing 91.

Figure 11:
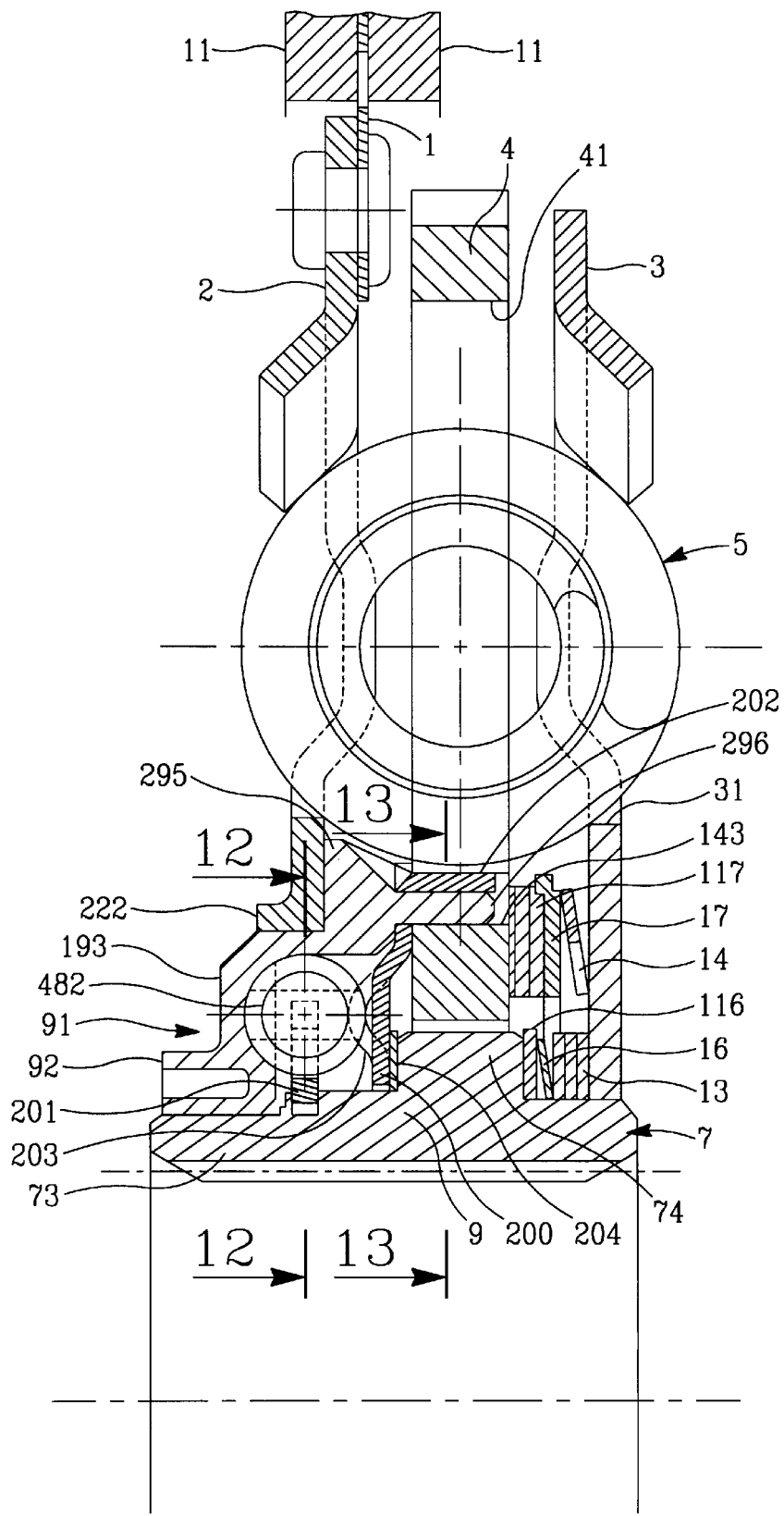
FIG. 11 is a view similar to FIG. 4 for a third example embodiment.

The disc 201 is able to act on the springs 480, 481 symmetrically as can be seen in FIG. 11.

Figure 12:
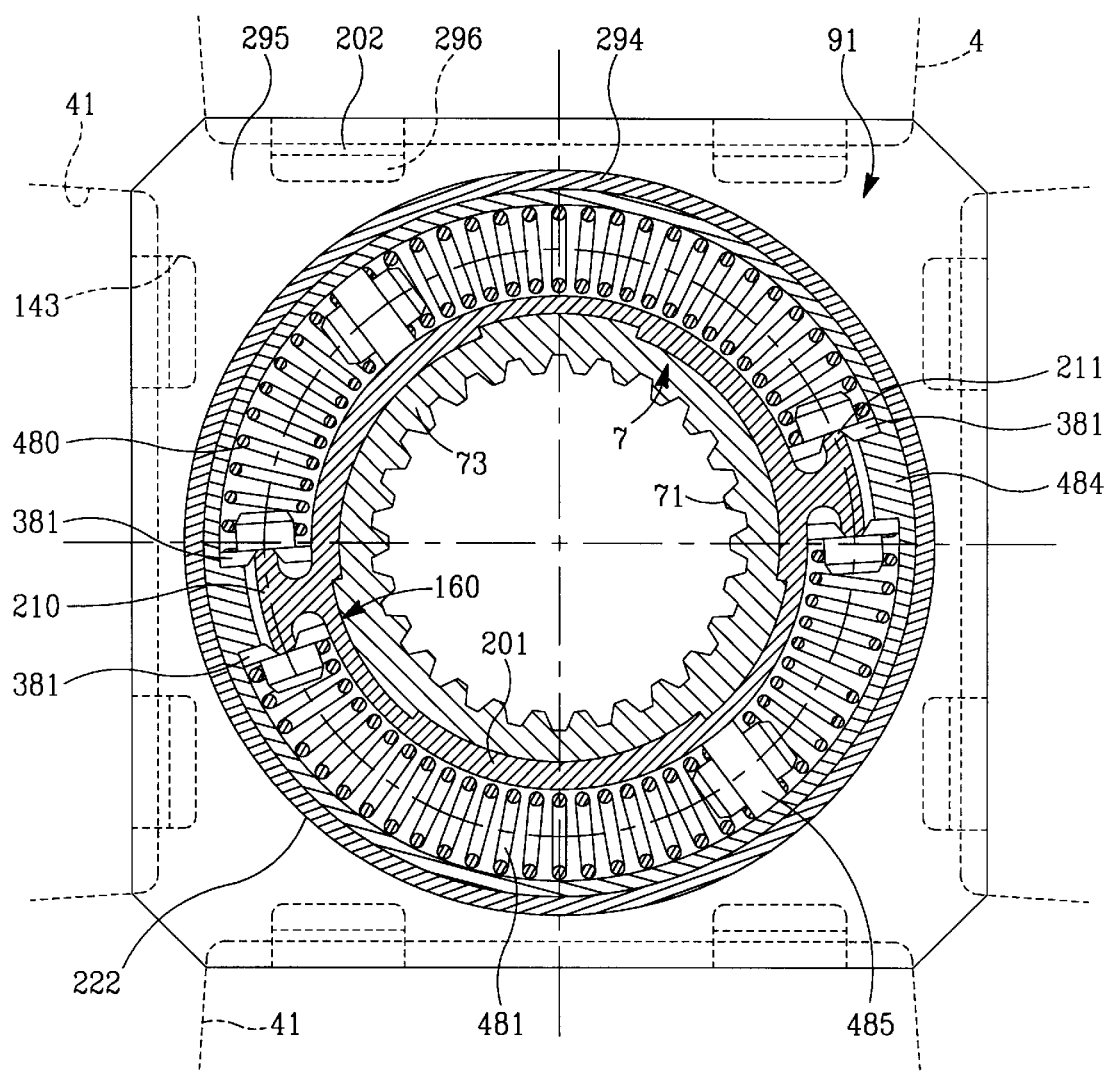
FIGS. 12 and 13 are views in cross section along the lines 12—12 and 13—13 in FIG. 11.
Figure 13:
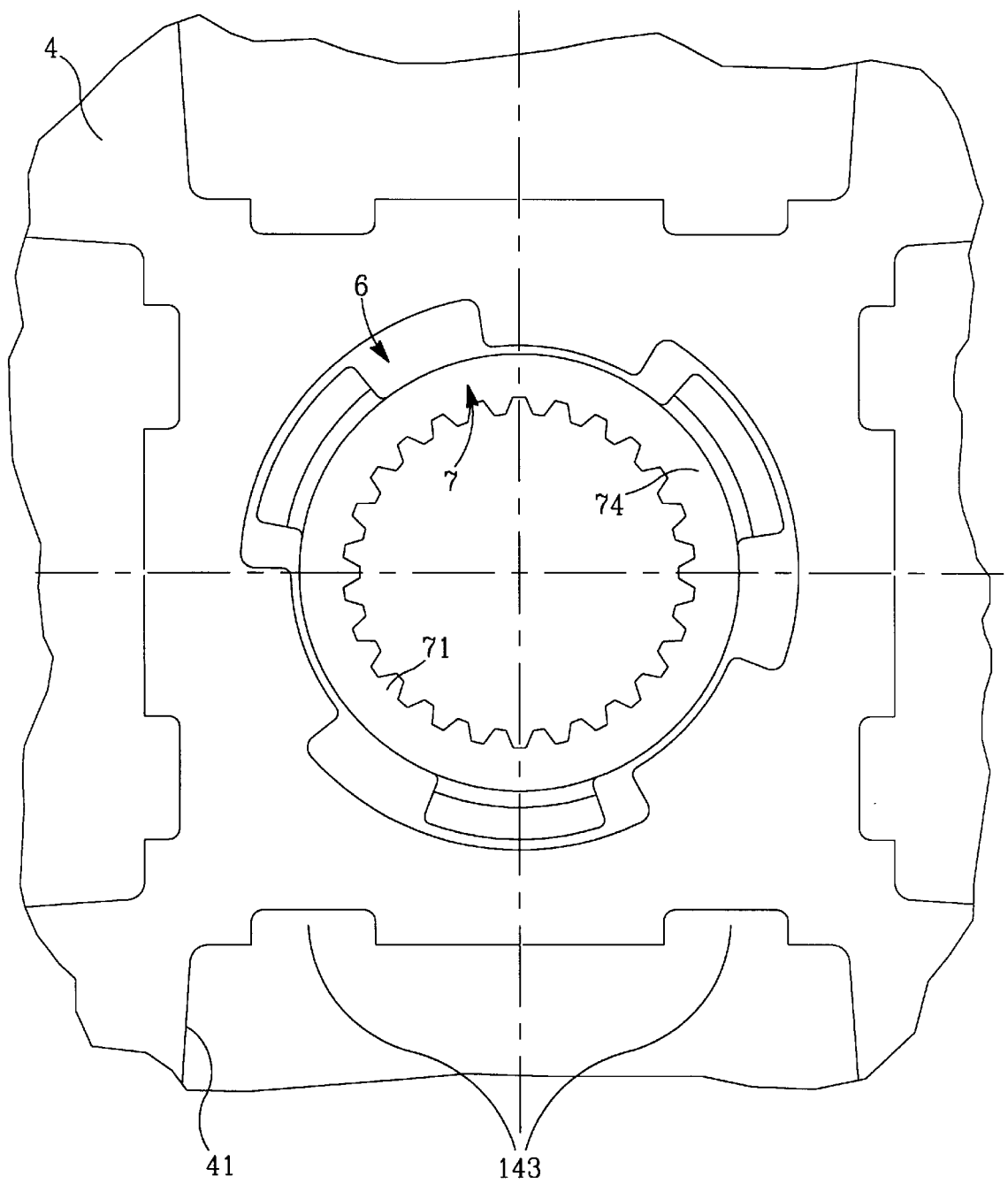

More precisely, the disc 201 has, projecting radially at its external periphery, arms 210 distributed regularly and circumferentially (FIG. 12). These arms 210 are extended circumferentially by fingers 211 able to act centrally on the back face of plates 381 serving as a support at the circumferential ends of the springs 480, 481.

These plates 381 have a centring stud entering the circumferential ends of the springs 480, 481, curved in this case. These springs 480, 481 can be pre-curved.

The recesses 483, in the form of a hollow, leave support projections 484 for the cups 381 having at their centre an indentation to cooperate with the fingers 211 of the arms 210.

The disc 201 is disposed axially between the wall 193 and a metal component 200 in the form of a plate having, locally, dishing 203 opposite the projections 484 to support the cups 381.

The flange 200 is in contact with the second area 74, more precisely with the transverse face thereof, through a washer 204. At its external periphery, the plate 200 has axial lugs 202 engaged circumferentially in a complementary manner in the openings 143 provided in the disc 4.

The lugs 202 are obtained by cutting out and folding the external periphery of the plate 200, in this case made of dished metal plate.

In the area where the lugs 202 are folded an opening is created for the passage of the studs 296 of the bearing 91. These studs 296 are in contact through their internal periphery with the bottom of the passage 143.

Thus the bearing 91 enables the disc 4 to be centred with respect to the hub 7, the bearing 91, by virtue of its second area 295, trimmed on the outside so as not to interfere with the springs 5, enables the plate 200 to be tightened in contact with the disc 4.

Thus the axial portion 294 always forms an axial brace between the disc 4 and the guide washer 2 with the plate 200 acting.

The fingers 296 are able to pass through a hole formed in the plate 200 at its lugs 202, so that the lugs 202 are unique and each extend circumferentially in a complementary manner into the opening 143.

As a variant, the fingers 296 pass through a recess open towards the outside and produced in the plate 200. In this case, the lugs 202 are segmented, each one coming into contact with the relevant edge of the opening 143. Of course, the fingers 296 are able to enter the openings 143 circumferentially in a complementary manner.

It can be seen that, by virtue of this type of assembly, it is possible to obtain a large number of embodiments.

In this case, the passages 143 are produced in the lower edges of the apertures 41, as can be seen for example in FIG. 12.

A simplified predamper with a curved spring 480, 481 using the bearing 91 is thus created.

It will be noted that the rim 222 constitutes a strengthening hoop for the wall 294, the radial axis of symmetry of the springs 480, 481 being in the plane of the internal end of the guide washer 2. Thus the wall 294 can be thin at the rim 222.

A solution which is very compact radially and axially is therefore obtained with a guide washer 2 of simple form.

The other guide washer 3 also has a simple form as in FIGS. 1 to 3 friction devices are interposed between the guide washer 3 and the disc 4.

These devices include the elastic washer 14, the application washer 17 bearing integrally a friction washer 117 designed to rub against the disc 4.

Radially below this first friction device there is found the friction device associated with the springs 480, 481 and having as in FIGS. 1 to 3 a washer 13, an elastic washer 16 bearing in this case on a metal protection washer 116.

It will be noted that, compared with FIG. 2, the direction of the position of the washer 13 and of the washer 16 has been reversed.

Of course, these axially acting friction devices can take the same form as those in FIGS. 4 to 10.

According to one characteristic, the springs 480, 481 are mounted in series.

More specifically, between two consecutive arms 210 of the disc 201, a support plate 381, a spring 480, a bracing piece 485, a spring 481 and a cup 381 are to be found.

The brace 485 forms a secondary support cup for the relevant circumferential ends of the springs 480, 481. More specifically, it is in the form of an annular disc having on each face studs entering the coil springs 480, 481.

The spring 480 is shorter than the spring 481 and less rigid than it.

Thus when there is relative angular movement between the disc 4 and the hub 7 in a first phase the springs 480 are compressed until they form a unit, that is to say with contiguous turns, and the springs 481 are then compressed until the clearance of the meshing means with clearance 6 is closed up.

During this relative movement between the disc 4 and hub 7, the ring 92 is allowed to rub against the hub 7 and no relative movement occurs between the guide washer 2 and the bearing 91 since the guide washers 2, 3 form a unit through the springs 5 with a significantly higher stiffness than the springs 480, 481.

Following the elimination of the meshing means with clearance 6 a relative movement occurs between the bearing 91 and the guide washer 2 since the said bearing 91 is rotationally fixed on the disc through the lugs 202 or studs 296.

In this case, friction is produced between the guide washer 2 and the walls 295 and 294.

Of course, during the relative movement between the disc 4 and the hub 7, the friction means 13, 16, 116 act while the friction means 14, 17, 117 are inactive and become active thereafter during the relative movement between the disc 4 and the guide washers 2, 3 that is to say following the closing up of the clearance in the meshing means 6.

The elastic washer 14 therefore enables the wall 295 and plate 200 to be clamped axially between the disc 4 and the guide washer 2.

Figure 14:
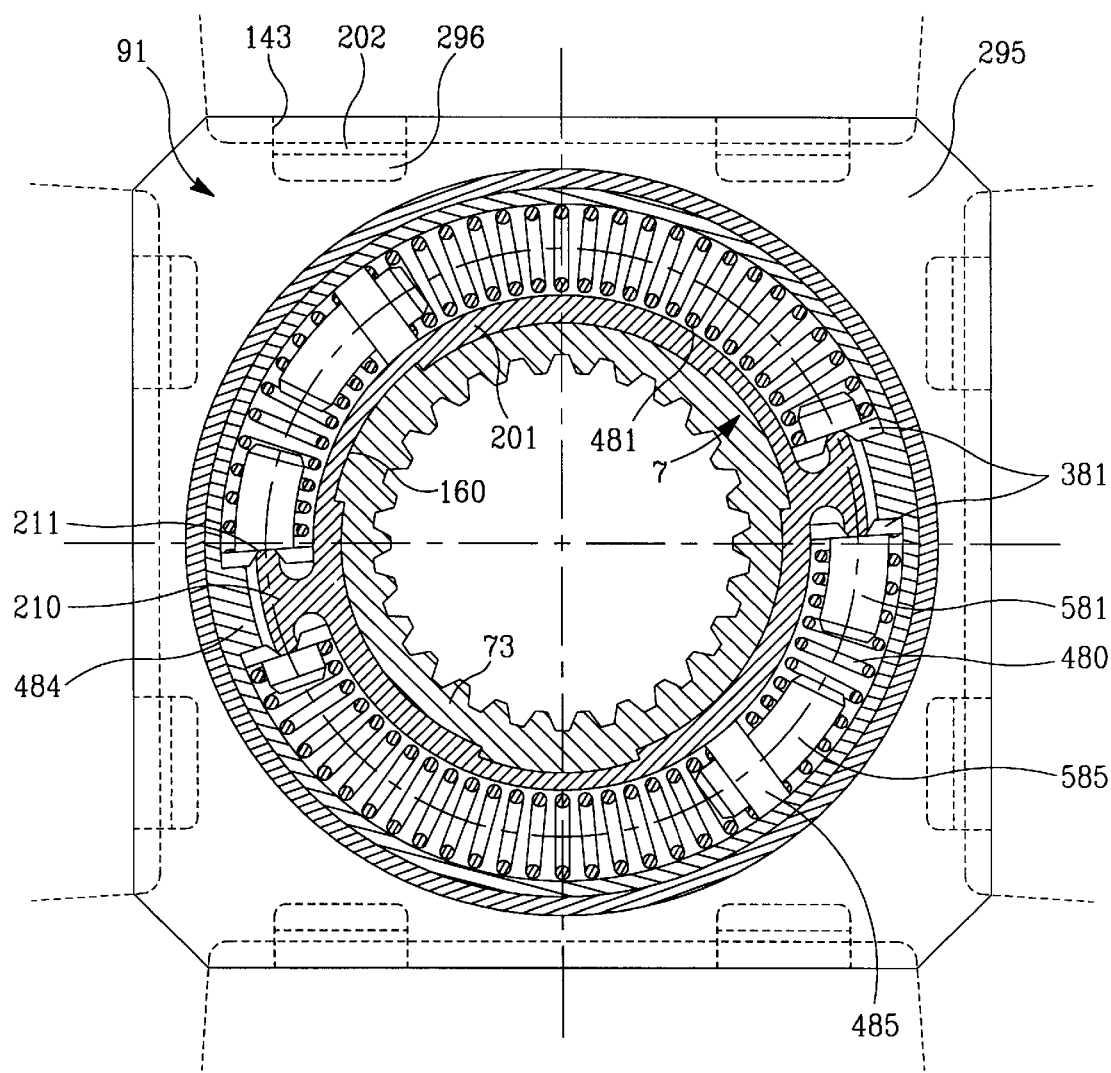
FIG. 14 is a view similar to FIG. 12 for another example embodiment.

Of course, the springs 480 need not form contiguous turns as shown in FIG. 14. In this case, a series of cups 381 is modified and has an arched finger 581 engaging in the spring 480.

The bracing piece 485 also has an arched finger 585 opposite the finger 581.

The cups 381 associated with the springs 480 are not modified.

Thus, during the relative movement between the disc 201 and the bearing 91, the arched fingers 585 and 581 are allowed to come into contact with each other to limit the compression of the springs 480 and then to compress the springs 481.

In all cases, low-stiffness springs with two stages are obtained. Of course, it is possible to simplify the damper further.

Figure 15:
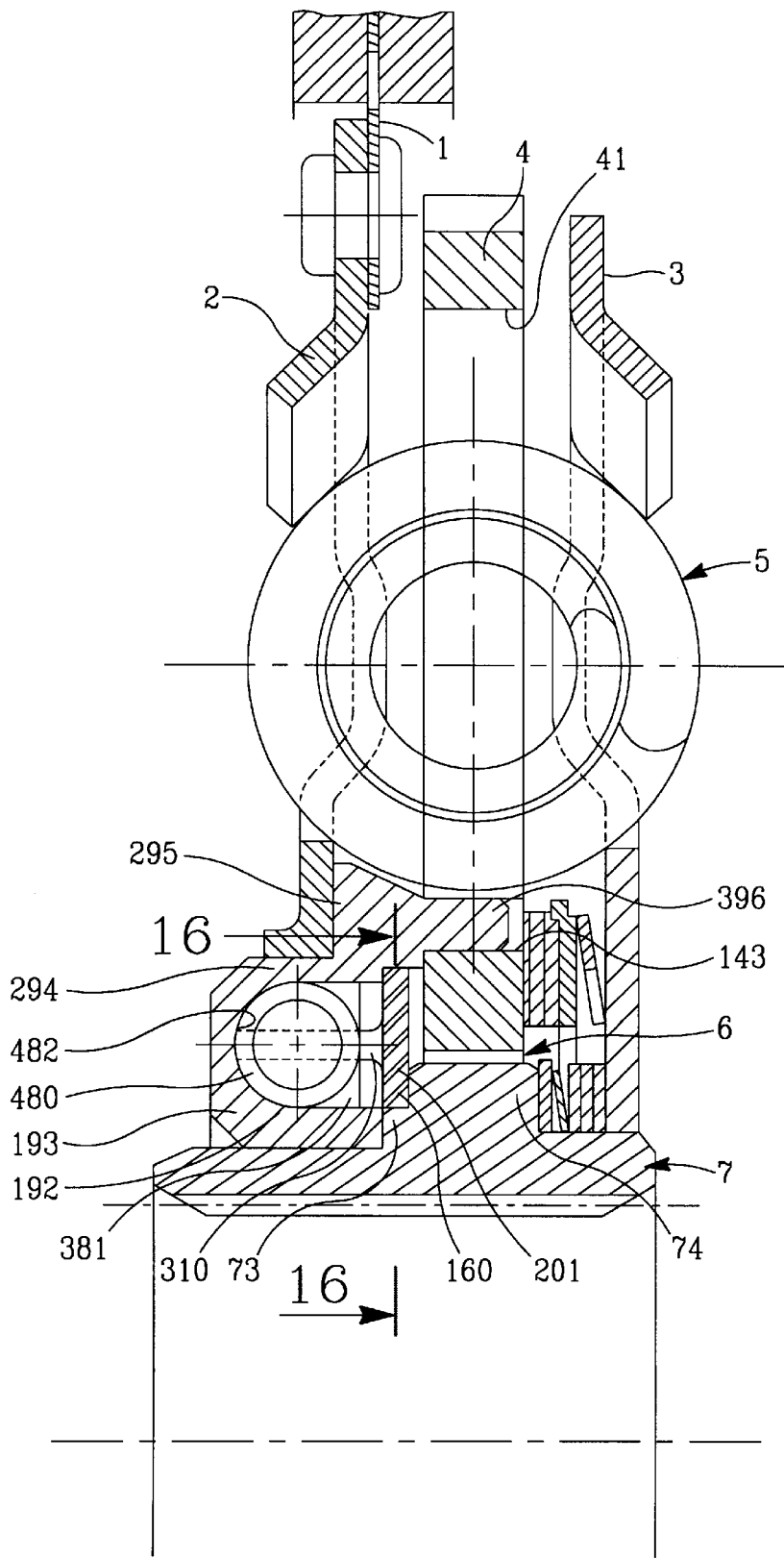
FIGS. 15 and 16 are views similar to FIG. 12 for another example embodiment.
Figure 16:
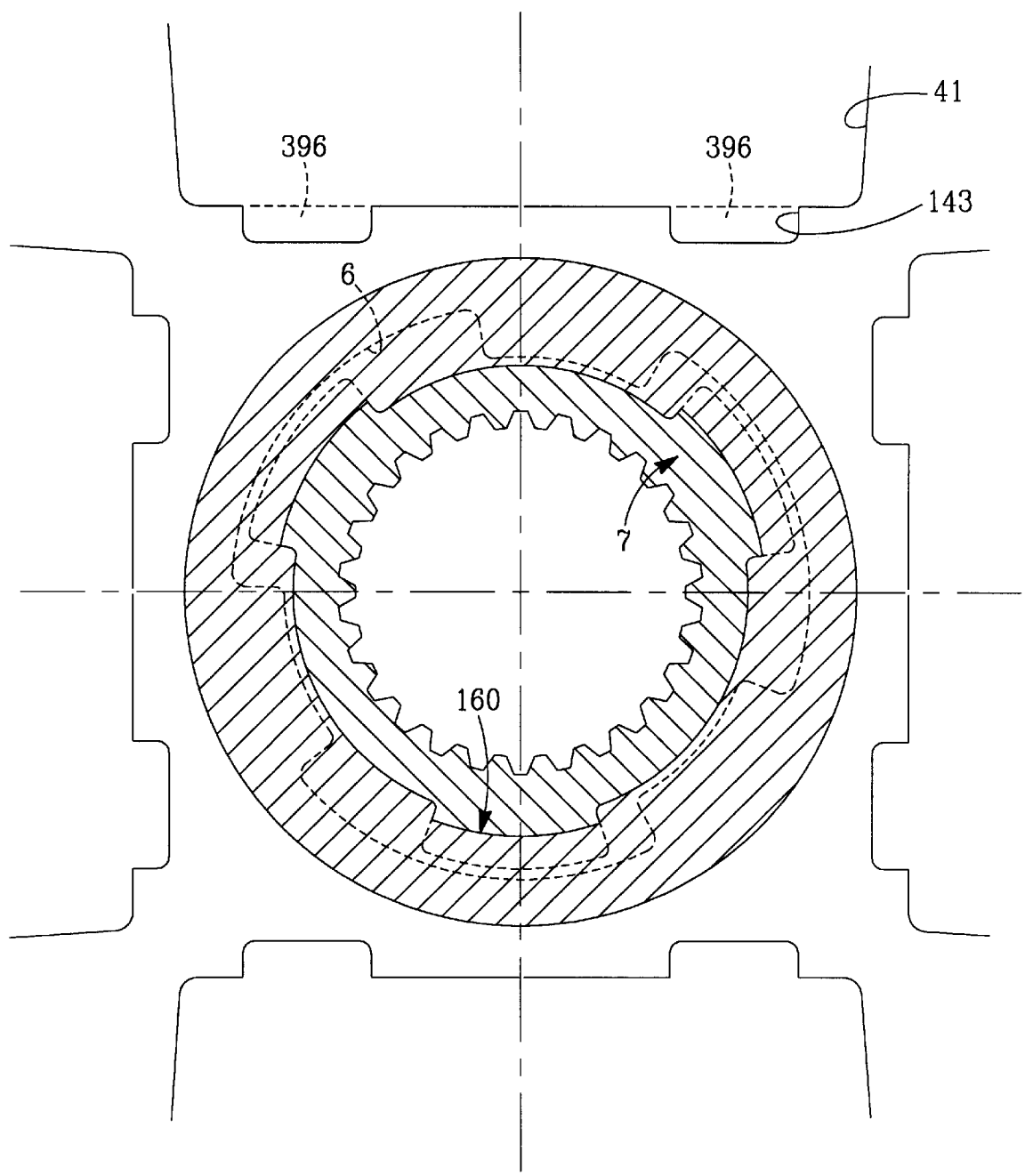

Thus in FIGS. 15 and 16 the bearing 91 has a shape similar to that in FIG. 11, apart from the fact that its ring 192 is facing the disc 4 and in close contact with the hub 7.

Thus, looking at the walls 294, 193 and 192 of the annular bearing 91, the latter has a U-shaped cross section whose arms face the disc 4.

The wall 295 has studs 396 which are thicker since these provide the rotary connection of the bearing 91 with the disc 4 and the studs 396 are able to be engaged by force in the openings 43. The secondary disc 201 is nearer to the disc 4.

In this case, the arms 310 of the disc 201 are directed axially to serve as a support in a symmetrical manner to the circumferential ends of the springs 480, 481 in FIGS. 11 to 14.

As before, this disc 201 is fixed with respect to rotation on the first area 73 by meshing means without clearance 160 located radially below the meshing means with clearance 6.

The disc 201 is not crimped on the hub 7 since it is retained axially, on the one hand, by the shoulder formed by the change in diameter which exists between the area 73 of reduced height and the area 74 in which the meshing means with clearance 6 are partially produced and, on the other hand, by the wall 295 of the bearing 91 and more specifically by the end face of the wall 295 facing the disc 4 at the wall 294.

In practice, a hollow is produced at this location to also centre the disc 201 radially.

A reduction in parts and axial size is thereby obtained since the ring 192 is facing the disc 4.

It will be appreciated that, in all the solutions according to the invention, the damper has in a chain a main damping device including the springs 5, the disc 4, the guide washers 2, 3 and a predamping device formed by means of the bearing 91 which allows the number of components to be reduced.

In all cases, the predamper can have springs with staged action.

It will be noted that the lugs 202 in FIG. 11 advantageously cover the studs 296 so that the plate 200 is clamped to the bearing 91.

It is therefore possible to form a sub-assembly including the bearing 91, the hub 7 and the springs 480, 481 with their cups and the braces and plate 200. The studs 296 can transmit the torque and therefore be in contact with the circumferential edges of the passages 143, and as a variant this transmission of torque can be performed by the lugs 202 then cooperating with the edge of the said openings.

Of course, the presence of the lugs 202 is not necessary when a sub-assembly is not to be formed.

We claim:

1. A Torsional damper having two coaxial parts mounted so as to move with respect to each other counter to first elastic members acting circumferentially wherein one of the coaxial parts has an input element fixed to two guide washers connected to each other and fixed by columns, while the other part has a disc and an output element, mounted so as to move with respect to each other counter to second elastic members acting circumferentially, called low-stiffness springs, with the action of meshing means with a clearance limiting the relative angular movement between the disc and the output element and wherein the guide washers are disposed on each side of the disc with the action of first friction means acting axially between the disc and the guide washers and second friction means acting axially between a flange of the output element, provided with teeth meshing with complementary teeth on the disc to form the meshing means with the clearance, and the guide washers, wherein the output element has at an external periphery thereof, projecting radially towards the outside, a stepped flange having a first area and a second area axially offset with respect to the first area, the second area has at its external periphery in a continuous manner the teeth of the output element belonging to the meshing means with the clearance, the low-stiffness elastic members are housed in the first area in open recesses formed in an annular bearing fixed with respect to rotation to the disc while being interposed on the one hand radially between one of the guide washers, referred to as the first guide washer, and the output element and, on the other hand, axially between the disc and the first guide washer so that the low-stiffness springs are housed in a cavity defined by the bearing and the first area of the stepped flange and the meshing means with the clearance.

2. A torsional damper comprising: two coaxial parts mounted so as to move with respect to each other counter to first elastic members acting circumferentially wherein one of the parts has an input element fixed to two guide washers connected to each other and fixed by columns, while the other part has a disc and an output element, mounted so as to move with respect to each other counter to second elastic members acting circumferentially, called low-stiffness springs, with the action of meshing means with a clearance limiting the relative angular movement between the disc and the output element and wherein the guide washers are disposed on each side of the disc with the action of first friction means acting axially between the disc and the guide washers and second friction means acting axially between a flange of the output element, provided with teeth meshing with complementary teeth on the disc to form the meshing means with the clearance, and the guide washers, the output element has at an external periphery thereof, projecting radially towards the outside, a stepped flange having a first area and a second area axially offset with respect to the first area, the second area has at its external periphery in a continuous manner the teeth of the output element belonging to the meshing means with the clearance, the low-stiffness elastic members are housed in the first area in open recesses formed in an annular bearing fixed with respect to rotation to the disc while being interposed on the one hand radially between one of the guide washers, referred to as the first guide washer, and the output element and, on the other hand, axially between the disc and the first guide washer so that the low-stiffness springs are housed in a cavity defined by the bearing and the first area of the stepped flange and the meshing means with the clearance wherein, the bearing has, moving from an internal periphery thereof to an external periphery thereof, respectively an axially oriented ring, a first wall with an overall transverse orientation, a wall with an overall axial orientation and a second wall with an overall transverse orientation.

3. The torsional damper according to claim 2, wherein the second wall with an overall transverse orientation carries at its external periphery studs each engaged in an opening in the disc for rotational connection between the bearing and the disc.

4. The torsional damper according to claim 3, wherein the studs are engaged by force in the openings to form a sub-assembly including the disc, the bearing and the low-stiffness springs.

5. The torsional damper according to claim 2, wherein the first wall is designed to rub in contact with one of the guide washers.

6. The torsional damper according to claim 2, wherein the recesses housing the low-stiffness springs are produced in the axially oriented wall of the bearing.

7. The torsional damper according to claim 6, wherein the recesses also affect the said wall.

8. The torsional damper according to claim 7, wherein the axially oriented ring is in close contact with the external periphery of the output element, while an external periphery of the first wall is in contact with an internal periphery of an axially oriented annular rim.

9. The torsional damper according to claim 8, wherein the axially oriented ring is directed axially towards the disc such that the bearing has a U-shaped cross section.

10. The torsional damper according to claim 9, wherein the low-stiffness elastic members comprise curved coil springs mounted in series between two consecutive arms belonging to a secondary disc fixed with respect to rotation on the first area of the flange.

11. The torsional damper according to claim 10, wherein a brace acts between the two springs and circumferential ends of the springs bear on the arms of the secondary disc through support cups with centering studs.

12. The torsional damper according to claim 2, wherein the low-stiffness elastic members are housed in open recesses formed radially opposite in the first area of the flange and in the bearing.

13. The torsional damper according to claim 12, wherein the recesses housing the low-stiffness elastic members are formed in the axially oriented wall of the bearing.

14. The torsional damper according to claim 13, wherein the recesses have different lengths for mounting, without circumferential clearance, a series of low-stiffness springs and, with clearance, another series of low-stiffness springs.

15. The torsional damper according to claim 12, wherein the low-stiffness springs are located partly radially below the meshing means with clearance and offset axially with respect to them, and in the second area extends projecting towards the outside with respect to the first area.

16. The torsional damper according to claim 2, wherein a back end of the axially oriented ring of the bearing is tapered so as to marry the shape of a tapered wall defining the first area of the flange of the hub.

* * * * *